(12) United States Patent
Zhang (10) Patent No.: US 11,858,792 B2
(45) Date of Patent: Jan. 2, 2024

(54) LIFTING MACHINE

(71) Applicant: Jiaxing Taixin Metal Products Co., Ltd., Zhejiang (CN)

(72) Inventor: Jianguo Zhang, Huzhou (CN)

(73) Assignee: JIAXING TAIXIN METAL PRODUCTS CO., LTD., Jiaxing (CN)

( * ) Notice: Subject to any disclaimer, the term of this patent is extended or adjusted under 35 U.S.C. 154(b) by 716 days.

(21) Appl. No.: 16/964,352

(22) PCT Filed: Sep. 30, 2019

(86) PCT No.: PCT/CN2019/109331
§ 371 (c)(1),
(2) Date: Jul. 23, 2020

(87) PCT Pub. No.: WO2021/003857
PCT Pub. Date: Jan. 14, 2021

(65) Prior Publication Data
US 2023/0159311 A1    May 25, 2023

(30) Foreign Application Priority Data
Jul. 9, 2019 (CN) .......................... 201910613299.0

(51) Int. Cl.
B66F 7/06    (2006.01)
B60S 5/00    (2006.01)
B66F 7/08    (2006.01)

(52) U.S. Cl.
CPC ............... B66F 7/0658 (2013.01); B60S 5/00 (2013.01); B66F 7/08 (2013.01)

(58) Field of Classification Search
CPC ........ B66F 7/0658; B66F 7/08; B66F 7/0641; B60S 5/00
See application file for complete search history.

(56) References Cited

U.S. PATENT DOCUMENTS

| 2,922,533 | A | * | 1/1960 | Barge, Jr. | ................. | B23Q 1/54 |
| | | | | | | 187/250 |
| 3,330,381 | A | * | 7/1967 | Halstead | ............... | B66F 7/0641 |
| | | | | | | 254/91 |
| 3,865,347 | A | * | 2/1975 | Pase | ...................... | B66F 7/0641 |
| | | | | | | 254/124 |
| 2002/0121632 | A1 | * | 9/2002 | Siglock | ................. | B66F 7/0641 |
| | | | | | | 254/133 R |

FOREIGN PATENT DOCUMENTS

| CN | 205873790 U | * | 1/2017 |
| CN | 110203847 A | * | 9/2019 |
| EP | 3293146 A1 | * | 3/2018 |

* cited by examiner

*Primary Examiner* — Mahdi H Nejad
(74) *Attorney, Agent, or Firm* — Daniel M. Cohn; Howard M. Cohn (57) ABSTRACT

A lifting machine comprising a base and a carrying platform, wherein a lifting mechanism for lifting the carrying platform and a power mechanism for supplying power to the lifting mechanism are arranged between the carrying platform and the base. The lifting machine of the present disclosure has simple structure, small volume and good portability, which may satisfy various needs of mobile use such as mobile maintenance, on-the-spot service and road rescue.

10 Claims, 6 Drawing Sheets

LIFTING MACHINE

TECHNICAL FIELD

This disclosure generally relates to the technical field of automobile maintenance, and more particularly, to a lifting machine.

BACKGROUND

A lifting machine is a machine used for facilitating automobile maintenance through lifting an automobile. Its operating principle is to propel a piston rod of an oil cylinder through a hydraulic oil cylinder arranged on the lifting machine, wherein a connecting rod system is arranged between a lifting platform and a base. Through the extending and contracting of the connecting rod system, the lifting and lowering of the lifting platform are achieved. Conventional lifting machines sold on the market are mainly divided into a column type and a scissor-type, which are mostly adopted in automobile maintenance shops and 4S shops. However, due to their large volume, high space occupation and poor portability, the requirements of mobile maintenance, on-the-spot service, and road rescue cannot be met.

SUMMARY

The purpose of the present disclosure is to provide a lifting machine with simple structure, small volume and good portability, which may satisfy various needs of mobile use such as mobile maintenance, on-the-spot service, and road rescue.

To achieve the above purpose, the present disclosure adopts the following technical solution: a lifting machine of the present disclosure comprising a base and a carrying platform, wherein a lifting mechanism for lifting the carrying platform and a power mechanism for supplying power to the lifting mechanism are arranged between the carrying platform and the base.

The base comprises a front base supporting rod and a rear base supporting rod which are horizontally arranged and are equal in length, wherein the front base supporting rod and the rear base supporting rod are arranged in parallel in a front-to-back manner. The left end of the front base supporting rod and the left end of the rear base supporting rod are connected through a first rotating shaft, and the first rotating shaft is rotatably connected to the left end of the front base supporting rod and the left end of the rear base supporting rod.

The carrying platform comprises two carrying platform supporting rods with equal length which are horizontally arranged. The lengths of the two carrying platform supporting rod are greater than that of the front base supporting rod. The two carrying platform supporting rods are arranged in parallel in a front-to-back manner. The left ends of the two carrying platform supporting rods are connected through a second rotating shaft, and the second rotating shaft is rotatably connected to the left ends of the two carrying platform supporting rods. The right ends of the two carrying platform supporting rods are connected through a third rotating shaft, and the third rotating shaft is rotatably connected to the right ends of the two carrying platform supporting rods.

The lifting mechanism comprises a first lifting rod, a second lifting rod, a third lifting rod, a fourth lifting rod, a fifth lifting rod, a sixth lifting rod, a seventh lifting rod and an eighth lifting rod which are equal in length. The first lifting rod and the second lifting rod are arranged in parallel in a front-to-back manner, the third lifting rod and the fourth lifting rod are arranged in parallel in a front-to-back manner, the fifth lifting rod and the sixth lifting rod are arranged in parallel in a front-to-back manner, and the seventh lifting rod and the eighth lifting rod are arranged in parallel in a front-to-back manner.

A first pin shaft is rotatably erected between the two carrying platform supporting rods, and the first pin shaft is arranged between the second rotating shaft and the third rotating shaft. The upper ends of the first lifting rod, the second lifting rod, the fifth lifting rod and the sixth lifting rod are respectively rotatably arranged on the first pin shaft. The lower ends of the fifth lifting rod and the sixth lifting rod are rotatably arranged on the first rotating shaft, and the upper ends of the third lifting rod and the fourth lifting rod are rotatably arranged on the second rotating shaft. The lower end of the first lifting rod is connected to the lower end of the third lifting rod through a first connecting rod, and the lower end of the first lifting rod is rotatably connected to the right end of the first connecting rod. The lower end of the third lifting rod is rotatably connected to the left end of the first connecting rod, and the lower end of the second lifting rod is connected to the lower end of the fourth lifting rod through a second connecting rod. The lower end of the second lifting rod is rotatably connected to the right end of the second connecting rod, and the lower end of the fourth lifting rod is rotatably connected to the left end of the second connecting rod. The upper ends of the seventh lifting rod and the eighth lifting rod are rotatably arranged on the third rotating shaft. The lower end of the seventh lifting rod is rotatably connected to the right end of the front base supporting rod, and the lower end of the eighth lifting rod is rotatably connected to the right end of the rear base supporting rod.

The lower ends of the third lifting rod and the fourth lifting rod are connected through a fourth rotating shaft. The lower ends of the third lifting rod and the fourth lifting rod, as well as the left ends of the first connecting rod and the second connecting rod, are rotatably connected with the fourth rotating shaft.

A locking mechanism for locking the highest lifting position of the carrying platform is arranged in front of the fourth rotating shaft and the first rotating shaft.

The power mechanism is an oil cylinder. A horizontal driving connecting rod is fixedly erected between the seventh lifting rod and the eighth lifting rod. A cylinder body of the oil cylinder is rotatably arranged on the driving connecting rod, and a piston rod of the oil cylinder is rotatably arranged on the fourth rotating shaft.

In another aspect of the present disclosure, the locking mechanism comprises a locking hook, and the locking hook further comprises a locking plate. The left end of the locking plate is rotatably mounted on the first rotating shaft, and the right end of the locking plate is bent downwards to form a bent portion inclining to the left from top to bottom. A hooking groove is formed between the bent portion and the locking plate, and a locking convex block protruding upwards is arranged on the fourth rotating shaft. When the lifting machine is in a locked state, the locking convex block is located in the hooking groove, and the left end surface of the bent portion is hooked on the right end surface of the locking convex block. The aforesaid locking mechanism has a simple structure, which achieves locking and unlocking through manual operation. Thus, a convenient operation is realized.

In another aspect of the present disclosure, the driving connecting rod is located between the upper end and the lower end of the seventh lifting rod. According to this design, the oil cylinder is arranged inclinedly, and the force provided by the oil cylinder is divided into a horizontal supporting force and a vertical supporting force, which makes the overall lifting of the present disclosure more stable. Meanwhile, the inclinedly-arranged oil cylinder isn't in contact with other parts, thus keeping other parts clean and tidy.

In another aspect of the present disclosure, both ends of the first connecting rod and the second connecting rod are provided with rolling wheels, which are capable of transmitting a pushing force.

In another aspect of the present disclosure, the front base supporting rod and the rear base supporting rod are connected through a horizontally arranged connecting base plate, and the rolling wheels are arranged on the connecting base plate in a rolling manner. Through the arrangement of the connecting base plate, the overall structure of the present disclosure becomes more stable, and the synchronous linkage of the lifting gets better.

In another aspect of the present disclosure, the upper ends of the first lifting rod, the second lifting rod, the third lifting rod, and the fourth lifting rod are located inside the two carrying platform supporting rods. The lower ends of the first lifting rod, the second lifting rod, the third lifting rod, and the fourth lifting rod are respectively located inside the front base supporting rod and the rear base supporting rod. The upper ends of the fifth lifting rod and the sixth lifting rod are respectively located outside the two carrying platform supporting rods, and the lower ends of the fifth lifting rod and the sixth lifting rod are respectively located outside the front base supporting rod and the rear base supporting rod. The upper ends of the seventh lifting rod and the eighth lifting rod are located inside the two carrying platform supporting rods, and the lower ends of the seventh lifting rod and the eighth lifting rod are respectively located inside the front base supporting rod and the rear base supporting rod. As the space between the base and the carrying platform of the lifting machine is reasonably utilized, the overall structure is compact, the size is small, and the portability is good.

In another aspect of the present disclosure, the two ends of the carrying platform are respectively provided with a horizontal supporting plate, and the supporting plate is fixedly mounted between the two carrying platform supporting rods. A supporting cushion block is detachably arranged on the supporting plate. Through arranging the supporting plate, a more stable structure is achieved, and better synchronous linkage of the lifting is realized. Meanwhile, the supporting plate provides a stably-supported space for the supporting cushion block, which functions as a cushioning when an automobile is lifted.

In another aspect of the present disclosure, the lifting machine further comprises an extension assembly. The extension assembly comprises two base extension supporting rods with equal length, two carrying platform extension supporting rods with equal length, a ninth lifting rod and a tenth lifting rod which are equal in length, and a base extension supporting rod and a carrying platform extension supporting rod which are equal in length, wherein the ninth lifting rod and the first lifting rod are equal in length.

The two base extension supporting rods are arranged in parallel in a front-to-back manner, the spacing between the two base extension supporting rods is equal to that between the front base supporting rod and the rear base supporting rod. The right ends of the two base extension supporting rods are connected to a fifth rotating shaft, and the fifth rotating shaft is rotatably connected to the right ends of the two base extension supporting rods.

The two carrying platform extension supporting rods are arranged in parallel in a front-to-back manner, and the spacing between the two carrying platform extension supporting rods is equal to that between the two carrying platform supporting rods. The right ends of the two carrying platform extension supporting rods are connected to a sixth rotating shaft, and the sixth rotating shaft is rotatably connected to the right ends of the two carrying platform extension supporting rods.

The upper ends of the ninth lifting rod and the tenth lifting rod are rotatably arranged on the sixth rotating shaft, and the lower ends of the ninth lifting rod and the tenth lifting rod are rotatably arranged on the fifth rotating shaft.

The front base supporting rod and the base extension supporting rod located at the rear, the front base supporting rod and the base extension supporting rod located at the front, the carrying platform supporting rod located at the front and the carrying platform extension supporting rod located at the front, as well as the carrying platform supporting rod located at the rear and the carrying platform extension supporting rod located at the rear are respectively rotatably connected through a connecting plate. After an automobile is lifted, the seventh lifting rod, the eighth lifting rod, the ninth lifting rod, the tenth lifting rod, the two base extension supporting rods, the two carrying platform extension supporting rods, and the four connecting plates form a parallelogram-shaped supporting frame. The arrangement of the extension assembly makes the lifting machine of the present disclosure suitable for automobiles with various lengths, and so a high universality is realized. After the extension assembly is installed and lifted up, by means of the parallelogram-shaped supporting frame, stable overall supporting and ideal balance are achieved.

In another aspect of the present disclosure, the connecting plate is provided with a plurality of mounting through holes from left to right at intervals. The same positions of the front base supporting rod and the rear base supporting rod, as well as the left ends of the two base extension supporting rods are all provided with base mounting through holes. A detachable connection between the connecting plate and the front base supporting rod, and a detachable connection between the rear base supporting rod and the two base extension supporting rods are achieved through base connecting shafts arranged between the base mounting through holes and the corresponding mounting through holes. The left end of the base extension supporting rod and the base connecting shaft are rotatably connected.

The same positions of the two carrying platform supporting rods and the left ends of the two carrying platform extension supporting rods are provided with carrying platform mounting through holes. A detachable connection between the connecting plate and the two carrying platform supporting rods, and a detachable connection between the connecting plate and the two carrying platform extension supporting rods are achieved through carrying platform connecting shafts arranged between the carrying platform mounting through holes and the corresponding mounting through holes. The left end of the carrying platform extension supporting rod and the carrying platform connecting shaft are rotatably connected.

A connecting line between the center of the carrying platform mounting through a hole in the carrying platform supporting rod located at the front and the center of the base mounting through a hole in the front base supporting rod is parallel to the central axis of the seventh lifting rod. A connecting line between the center of the carrying platform mounting through a hole in the carrying platform supporting rod located at the rear and the center of the base mounting through a hole in the rear base supporting rod is parallel to the central axis of the eighth lifting rod. According to the aforesaid design, the length of the extension assembly may be adjusted according to different automobiles, achieving a high universality of the lifting machine.

In another aspect of the present disclosure, an extension connecting plate is arranged between the two carrying platform extension supporting rods, and a supporting cushion block is detachably arranged on the extension connecting plate. Through arranging the extension connecting plate, the overall structure becomes more stable, and the synchronous linkage of the lifting gets better. Meanwhile, a stably-supported space is provided to the supporting cushion block functioning as a cushioning when an automobile is lifted.

An extension bottom plate is arranged between the two base extension supporting rods. Through the arrangement of the extension bottom plate, the synchronous linkage of the lifting becomes better.

Compared with the prior art, the present disclosure has the following advantages: after an automobile is lifted by the lifting mechanism, the first lifting rod, the second lifting rod, the third lifting rod, the fourth lifting rod, the front base supporting rod, the rear base supporting rod and the carrying platform supporting rod combine to form a parallelogram-shaped supporting frame. In the meantime, the fifth lifting rod, the sixth lifting rod, the seventh lifting rod, the eighth lifting rod, the front base supporting rod, the rear base supporting rod and the carrying platform supporting rod combine to form a parallelogram-shaped supporting frame in the reverse direction of the aforesaid supporting frame. The two parallelogram-shaped supporting frames in opposite directions interact with each other, thereby achieving stable lifting and supporting of the present disclosure. Compared with conventional lifting machines, the present disclosure has simple structure, low weight and small volume. Its good portability allows the present disclosure to be conveniently carried with an automobile, so that the requirement of mobile maintenance is met. Moreover, the present disclosure is suitable for home storage, and so the self-maintenance of an automobile becomes easy. The synchronous linkage of the third lifting rod and the fourth lifting rod is achieved through the fourth rotating shaft, making the lifting more stable. Additionally, the length of the carrying platform supporting rod is greater than that of the base supporting rod. After an automobile is lifted and supported, a trapezoidal structure whose upper portion is bigger than the lower portion is formed. Meanwhile, through the locking mechanism arranged between the first rotating shaft and the fourth rotating shaft, a highest lifting position is locked. In this way, each connection point of the trapezoidal structure forms a stably-fixed point such that the overall lifting and supporting is more stable.

DETAILED DESCRIPTION

Figures and detailed embodiments are combined hereinafter to further elaborate the technical solution of the present disclosure.

Embodiment 1: as shown in FIGS. 1-3 and 8, the lifting machine of the present disclosure comprises a base 1 and a carrying platform 2, wherein a lifting mechanism for lifting the carrying platform 2 and a power mechanism for supplying power to the lifting mechanism are arranged between the carrying platform 2 and the base 1.

The base 1 comprises a front base supporting rod 101 and a rear base supporting rod 102 which are horizontally arranged and are equal in length, wherein the front base supporting rod 101 and the rear base supporting rod 102 are arranged in parallel in a front-to-back manner. The left end of the front base supporting rod 101 and the left end of the rear base supporting rod 102 are connected through a first rotating shaft 103, and the first rotating shaft 103 is rotatably connected to the left end of the front base supporting rod 101 and the left end of the rear base supporting rod 102.

The carrying platform 2 comprises two horizontally arranged carrying platform supporting rods 201 with equal length. The length of the carrying platform supporting rod 201 is greater than that of the front base supporting rod 101. The two carrying platform supporting rods are arranged in parallel in a front-to-back manner. The left ends of the two carrying platform supporting rods 201 are connected through a second rotating shaft 202, and the second rotating shaft 202 is rotatably connected to the left ends of the two carrying platform supporting rods 201. The right ends of the two carrying platform supporting rods 201 are connected through a third rotating shaft 203, and the third rotating shaft 203 is rotatably connected to the right ends of the two carrying platform supporting rods 201.

The lifting mechanism comprises a first lifting rod J1, a second lifting rod J2, a third lifting rod J3, a fourth lifting rod J4, a fifth lifting rod J5, a sixth lifting rod J6, a seventh lifting rod J7 and an eighth lifting rod J8 which are equal in length. The first lifting rod J1 and the second lifting rod J2 are arranged in parallel in a front-to-back manner, the third lifting rod J3 and the fourth lifting rod J4 are arranged in parallel in a front-to-back manner, the fifth lifting rod J5 and the sixth lifting rod J6 are arranged in parallel in a front-to-back manner, and the seventh lifting rod J7 and the eighth lifting rod J8 are arranged in parallel in a front-to-back manner.

A first pin shaft 204 is rotatably erected between the two carrying platform supporting rods 201, and the first pin shaft 204 is arranged between the second rotating shaft 202 and the third rotating shaft 203. The upper ends of the first lifting rod J1, the second lifting rod J2, the fifth lifting rod J5, and the sixth lifting rod J6 are respectively rotatably arranged on the first pin shaft 204. The lower ends of the fifth lifting rod J5 and the sixth lifting rod J6 are rotatably arranged on the first rotating shaft 103, and the upper ends of the third lifting rod J3 and the fourth lifting rod J4 are rotatably arranged on the second rotating shaft 202. The lower end of the first lifting rod J1 is connected to the lower end of the third lifting rod J3 through a first connecting rod J13, and the lower end of the first lifting rod J1 is rotatably connected to the right end of the first connecting rod J13. The lower end of the third lifting rod J3 is rotatably connected to the left end of the first connecting rod J13, and the lower end of the second lifting rod J2 is connected to the lower end of the fourth lifting rod J4 through a second connecting rod J24. The lower end of the second lifting rod J2 is rotatably connected to the right end of the second connecting rod J24, and the lower end of the fourth lifting rod J4 is rotatably connected to the left end of the second connecting rod J24. The upper ends of the seventh lifting rod J7 and the eighth lifting rod J8 are rotatably arranged on the third rotating shaft 203. The lower end of the seventh lifting rod J7 is rotatably connected to the right end of the front base supporting rod 101, and the lower end of the eighth lifting rod J8 is rotatably connected to the right end of the rear base supporting rod 102.

The lower ends of the third lifting rod J3 and the fourth lifting rod J4 are connected through a fourth rotating shaft J34. The lower ends of the third lifting rod J3 and the fourth lifting rod J4, as well as the left ends of the first connecting rod J13 and the second connecting rod J24, are rotatably connected with the fourth rotating shaft J34.

A locking mechanism for locking the highest lifting position of the carrying platform 2 is arranged in front of the fourth rotating shaft J34 and the first rotating shaft 103.

The power mechanism is an oil cylinder 3. A horizontal driving connecting rod 4 is fixedly erected between the seventh lifting rod J7 and the eighth lifting rod J8. A cylinder body 31 of the oil cylinder 3 is rotatably arranged on the driving connecting rod 4, and a piston rod 32 of the oil cylinder 3 is rotatably arranged on the fourth rotating shaft J34.

Figure 1:
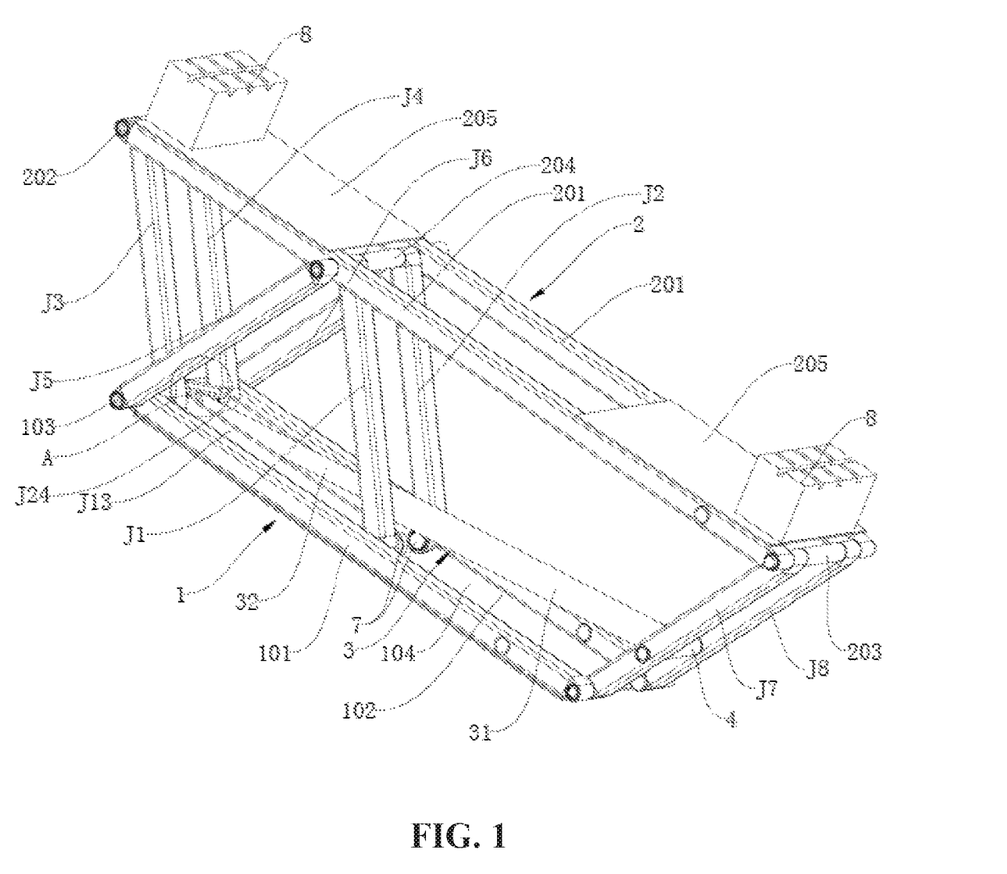
FIG. 1 is a three-dimensional diagram illustrating an example structure when the lifting machine in embodiment 1 of the present disclosure is in an unfolded state.
Figure 2:
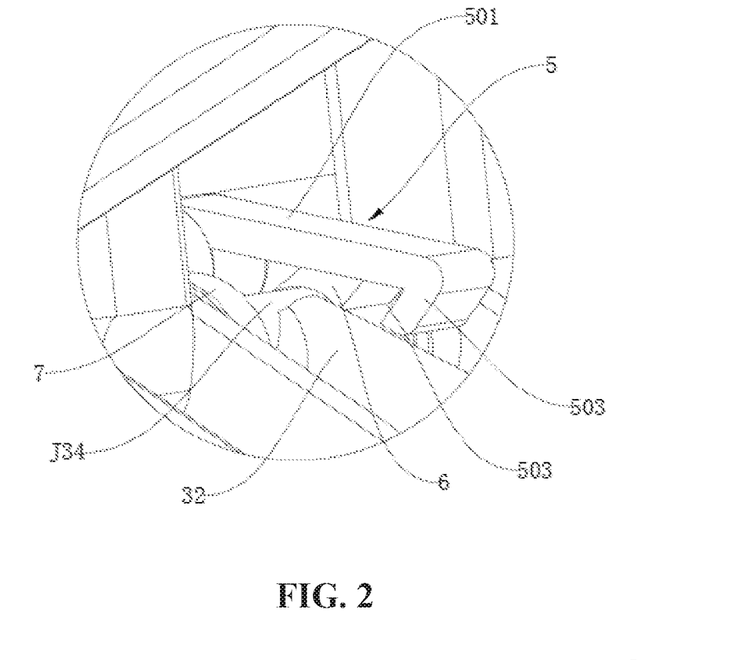
FIG. 2 is an enlarged diagram of portion A in FIG. 1.

In this embodiment, the locking mechanism comprises a locking hook 5, and the locking hook 5 further comprises a locking plate 501. The left end of the locking plate 501 is rotatably mounted on the first rotating shaft 103, and the right end of the locking plate 501 is bent downwards to form a bent portion 502 inclining to the left from top to bottom. A hooking groove 503 is formed between the bent portion 502 and the locking plate 501, and a locking convex block 6 protruding upwards is arranged on the fourth rotating shaft J34. When the lifting machine is in a locked state, the locking convex block 6 is located in the hooking groove 503, and the left end surface of the bent portion 502 is hooked on the right end surface of the locking convex block 6. The aforesaid locking mechanism has a simple structure, which achieves locking and unlocking through manual operation. Thus, a convenient operation is realized.

In this embodiment, the driving connecting rod 4 is located between the upper end and the lower end of the seventh lifting rod J7. According to this design, the oil cylinder 3 is arranged inclinedly, and the force provided by the oil cylinder 3 is divided into a horizontal supporting force and a vertical supporting force, which makes the overall lifting of the present disclosure more stable. Meanwhile, the inclinedly-arranged oil cylinder 3 isn't in contact with other parts, thus keeping other parts clean and tidy.

In this embodiment, both ends of the first connecting rod J13 and the second connecting rod J24 are provided with rolling wheels 7, which are capable of transmitting a pushing force.

In this embodiment, the front base supporting rod 101 and the rear base supporting rod 102 are connected through a horizontally-arranged connecting base plate 104, and the rolling wheels 7 are arranged on the connecting base plate 104 in a rolling manner. Through the arrangement of the connecting base plate, the overall structure of the present disclosure becomes more stable, and the synchronous linkage of the lifting gets better.

In this embodiment, the upper ends of the first lifting rod J1, the second lifting rod J2, the third lifting rod J3 and the fourth lifting rod J4 are located inside the two carrying platform supporting rods 201. The lower ends of the first lifting rod J1, the second lifting rod J2, the third lifting rod J3 and the fourth lifting rod J4 are respectively located inside the front base supporting rod 101 and the rear base supporting rod 102. The upper ends of the fifth lifting rod J5 and the sixth lifting rod J6 are respectively located outside the two carrying platform supporting rods 201, and the lower ends of the fifth lifting rod J5 and the sixth lifting rod J6 are respectively located outside the front base supporting rod 101 and the rear base supporting rod 102. The upper ends of the seventh lifting rod J7 and the eighth lifting rod J8 are located inside the two carrying platform supporting rods 201, and the lower ends of the seventh lifting rod J7 and the eighth lifting rod J8 are respectively located inside the front base supporting rod 101 and the rear base supporting rod 102. As the space between the base 1 and the carrying platform 2 of the lifting machine is reasonably utilized, the overall structure is compact, the size is small, and the portability is good.

In this embodiment, the two ends of the carrying platform 2 are respectively provided with a horizontal supporting plate 205, and the supporting plate 205 is fixedly mounted between the two carrying platform supporting rods 201. A supporting cushion block 8 is detachably arranged on the supporting plate 205. Through arranging the supporting plate 205, a more stable structure is achieved, and a better synchronous linkage of the lifting is realized. Meanwhile, the supporting plate 205 provides a stably-supported space for the supporting cushion block 8, which functions as a cushioning when an automobile is lifted.

Figure 3:
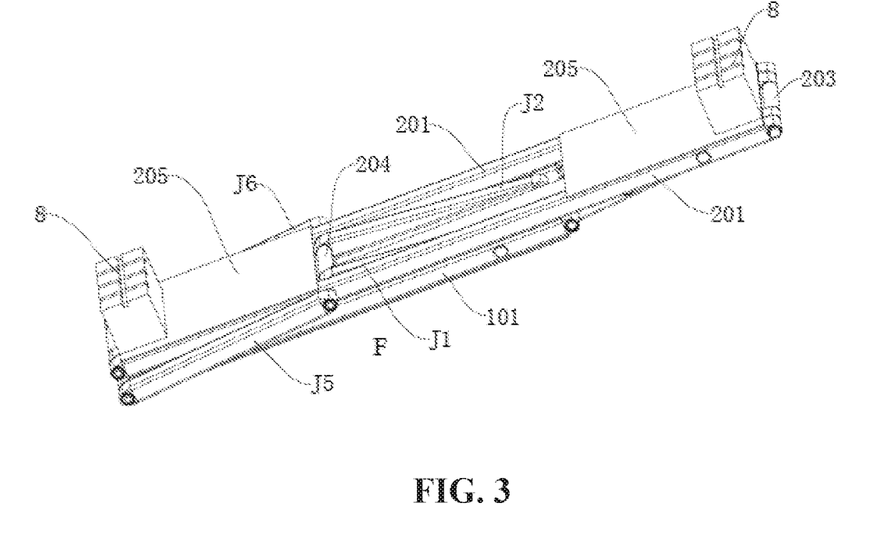
FIG. 3 is a conceptual diagram illustrating an example structure when the lifting machine in embodiment 1 of the present disclosure is in a folded state.

When the lifting machine isn't used, the piston rod 32 of the oil cylinder 3 retracts into the cylinder body 31. At this point, the whole lifting mechanism is in a folded state. When there's a need to lift an automobile, the piston rod 32 of the oil cylinder 3 extends outwards to push the fourth rotating shaft J34. The pushing force imposed by the piston rod 32 pushes the lifting rods up, thereby lifting the carrying platform 2. After the carrying platform 2 is lifted in place, the locking hook 5 is hooked on the locking convex block 6. In this way, the position of the carrying platform is locked. When the lifting machine needs to be folded, the locking hook 5 is removed from the locking convex block 6, and the piston rod 32 retracts, thus imposing a pulling force on the fourth rotating shaft J34. The pulling force imposed by the piston rod 32 pulls the lifting rods down, which allows the carrying platform 2 to be folded downwards. After the piston rod 32 retracts in place, the folding is completed.

Embodiment 2: as shown in FIGS. 4-8, what makes embodiment 1 different from embodiment 2 is that the lifting machine in embodiment 2 further comprises an extension assembly. The extension assembly comprises two base extension supporting rods 11 with equal length, two carrying platform extension supporting rods 21 with equal length, a ninth lifting rod J9 and a tenth lifting rod J10 which are equal in length, and a base extension supporting rod 11 and a carrying platform extension supporting rod 21 which are equal in length, wherein the ninth lifting rod J9 and the first lifting rod J1 are equal in length.

The two base extension supporting rods 11 are arranged in parallel in a front-to-back manner, the spacing between the two base extension supporting rods 11 is equal to that between the front base supporting rod 101 and the rear base supporting rod 102. The right ends of the two base extension supporting rods 11 are connected to a fifth rotating shaft 12, and the fifth rotating shaft 12 is rotatably connected to the right ends of the two base extension supporting rods 11.

The two carrying platform extension supporting rods 21 are arranged in parallel in a front-to-back manner, and the spacing between the two carrying platform extension supporting rods 21 is equal to that between the two carrying platform supporting rods 201. The right ends of the two carrying platform extension supporting rods 21 are connected to a sixth rotating shaft 22, and the sixth rotating shaft 22 is rotatably connected to the right ends of the two carrying platform extension supporting rods 21.

The upper ends of the ninth lifting rod J9 and the tenth lifting rod J10 are rotatably arranged on the sixth rotating shaft 22, and the lower ends of the ninth lifting rod J9 and the tenth lifting rod J10 are rotatably arranged on the fifth rotating shaft 12.

The front base supporting rod 101 and the base extension supporting rod 11 located at the rear, the front base supporting rod 101 and the base extension supporting rod 11 located at the front, the carrying platform supporting rod 201 located at the front and the carrying platform extension supporting rod 21 located at the front, as well as the carrying platform supporting rod 201 located at the rear and the carrying platform extension supporting rod 21 located at the rear are respectively rotatably connected through a connecting plate 9. After being pushed up, the seventh lifting rod J7, the eighth lifting rod J8, the ninth lifting rod J9, the tenth lifting rod J10, the two base extension supporting rods 11, the two carrying platform extension supporting rods 21 and the four connecting plates 9 form a parallelogram-shaped supporting frame. The arrangement of the extension assembly makes the lifting machine of the present disclosure suitable for automobiles with various lengths, and so a high universality is realized. After the extension assembly is installed and lifted up, by means of the parallelogram-shaped supporting frame, stable overall supporting and ideal balance are achieved.

Figure 7:
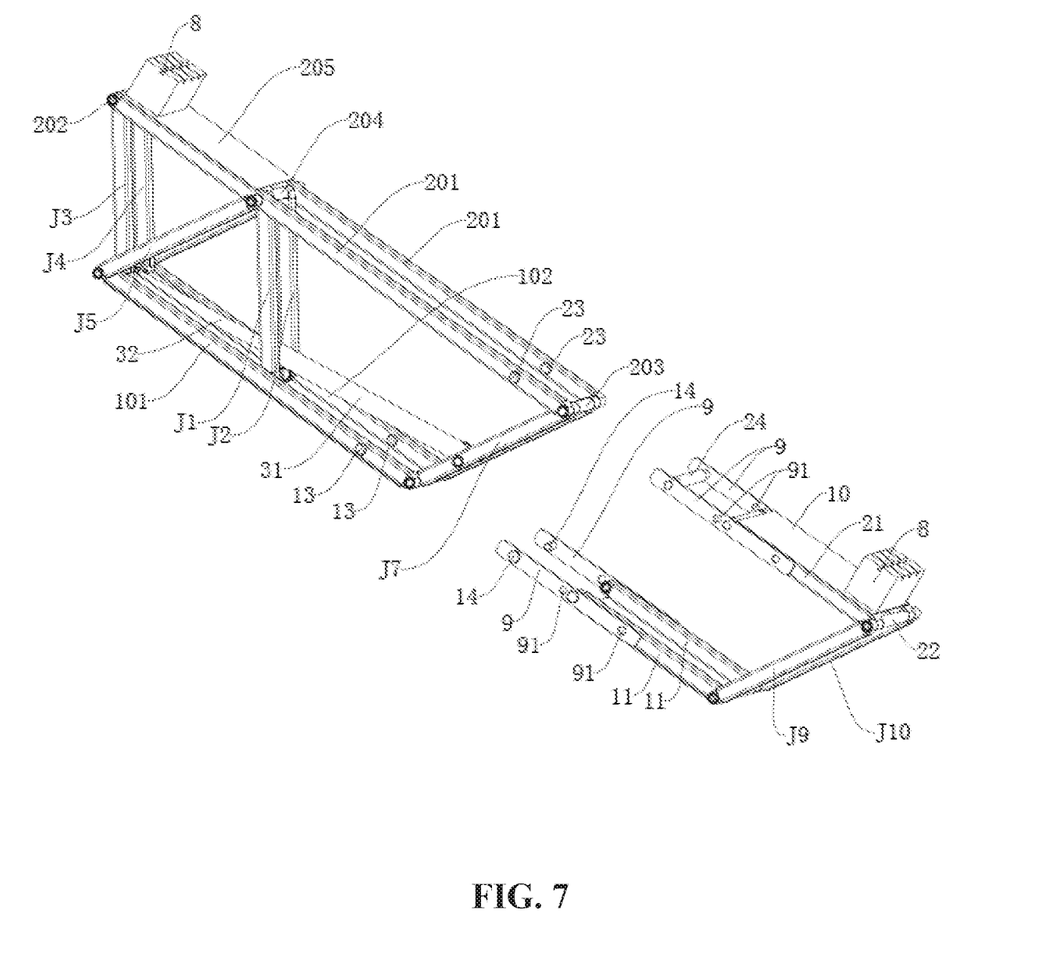
FIG. 7 is an explosive view when the lifting machine in embodiment 2 of the present disclosure is in an unfolded state.
Figure 8:
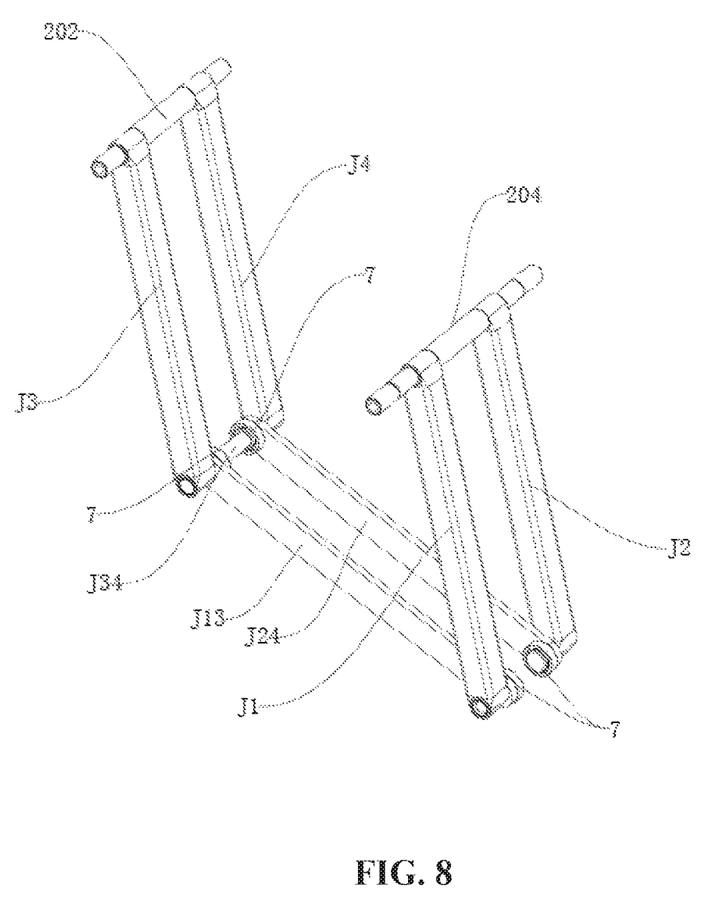
FIG. 8 is a conceptual diagram illustrating an example structure when the first lifting rod, the second lifting rod, the third lifting rod and the fourth lifting rod are connected and interact with each other in an unfolded state.

In this embodiment, the connecting plate 9 is provided with a plurality of mounting through holes 91 from left to right at intervals. The same positions of the front base supporting rod 101 and the rear base supporting rod 102, as well as the left ends of the two base extension supporting rods 11 are all provided with base mounting through holes 13. A detachable connection between the connecting plate 9 and the front base supporting rod 101, and a detachable connection between the rear base supporting rod 102 and the two base extension supporting rods 11 are achieved through base connecting shafts 14 arranged between the base mounting through holes 13 and the corresponding mounting through holes 91. The left end of the base extension supporting rod 11 and the base connecting shaft 14 are rotatably connected.

The same positions of the two carrying platform supporting rods and the left ends of the two carrying platform extension supporting rods 11 are provided with carrying platform mounting through holes 23. A detachable connection between the connecting plate 9 and the two carrying platform supporting rods 201, and a detachable connection between the connecting plate 9 and the two carrying platform extension supporting rods 21 are achieved through carrying platform connecting shafts 24 arranged between the carrying platform mounting through holes 23 and the corresponding mounting through holes 91. The left end of the carrying platform extension supporting rod 21 and the carrying platform connecting shaft 24 are rotatably connected.

A connecting line between the center of the carrying platform mounting through hole 23 in the carrying platform supporting rod 201 located at the front and the center of the base mounting through hole 13 in the front base supporting rod 101 is parallel to the central axis of the seventh lifting rod J7. A connecting line between the center of the carrying platform mounting through hole 23 in the carrying platform supporting rod 201 located at the rear and the center of the base mounting through hole 13 in the rear base supporting rod 102 is parallel to the central axis of the eighth lifting rod J8. According to the aforesaid design, the length of the extension assembly may be adjusted according to different automobiles, achieving a high universality of the lifting machine.

Figure 4:
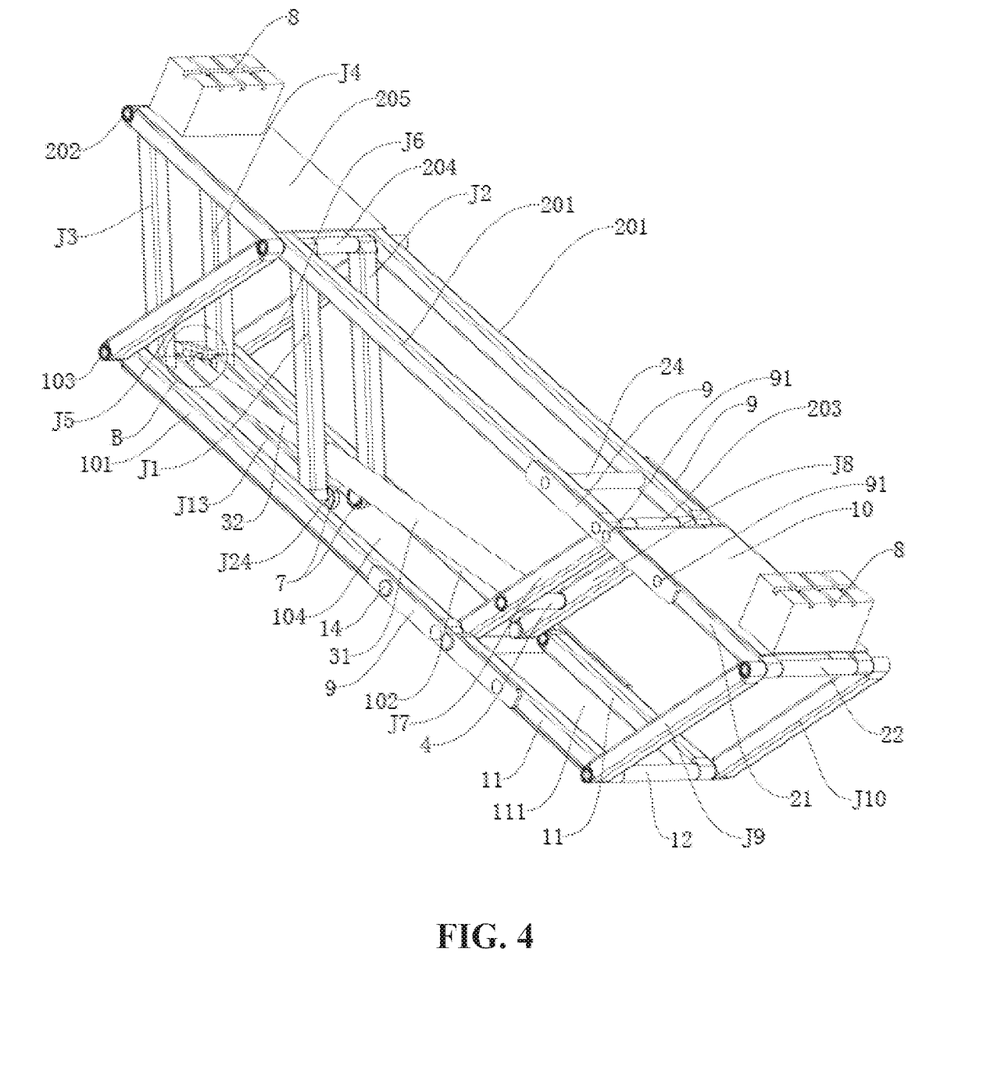
FIG. 4 is a three-dimensional diagram illustrating an example structure when the lifting machine in embodiment 2 of the present disclosure is unfolded and locked.
Figure 5:
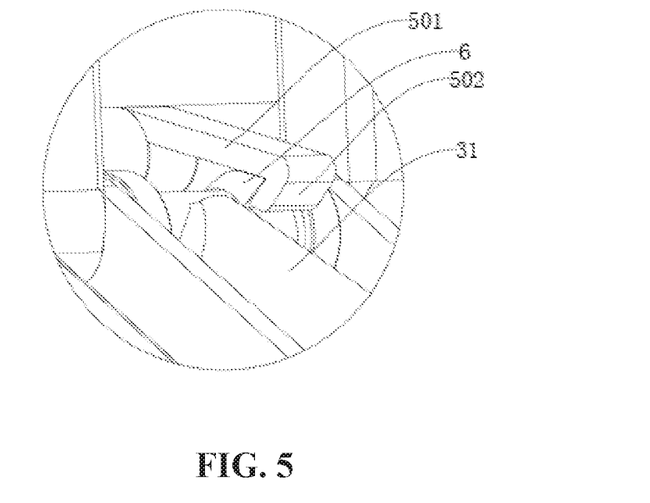
FIG. 5 is an enlarged diagram of portion B in FIG. 4.
Figure 6:
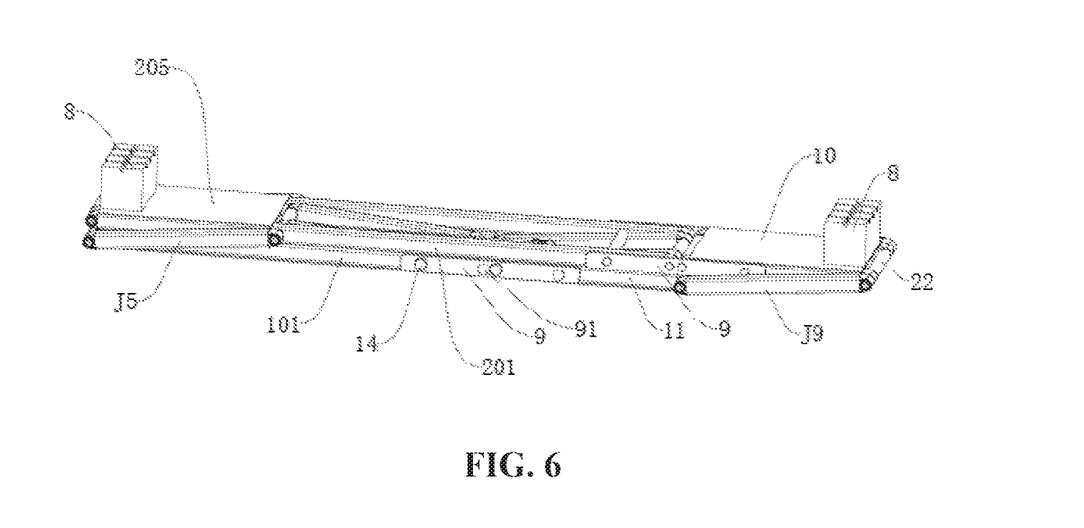
FIG. 6 is a conceptual diagram illustrating an example structure when the lifting machine in embodiment 2 of the present disclosure is in a folded state.

In this embodiment, an extension connecting plate 10 is arranged between the two carrying platform extension supporting rods 21, and a supporting cushion block 8 is detachably arranged on the extension connecting plate 10. Through arranging the extension connecting plate 10, the overall structure becomes more stable, and the synchronous linkage of the lifting gets better. Meanwhile, a stably supported space is provided to the supporting cushion block 8 functioning as a cushioning when an automobile is lifted. During use, the two supporting plates 205 arranged at the right ends of the two carrying platform supporting rods 201 may be removed according to actual needs.

In this embodiment, an extension bottom plate 111 is arranged between the two base extension supporting rods 11. Through the arrangement of the extension bottom plate 111, a better synchronous linkage of the lifting is achieved.

What is claimed is:

1. A lifting machine, comprising:
   a base, and
   a carrying platform, wherein a lifting mechanism for lifting the carrying platform and a power mechanism for supplying power to the lifting mechanism are arranged between the carrying platform and the base,
   wherein the base comprises: a front base supporting rod and a rear base supporting rod which are horizontally arranged and are equal in length, wherein the front base supporting rod and the rear base supporting rod are arranged in parallel in front-to-back manner, wherein the left end of the front base supporting rod and the left end of the rear base supporting rod are connected through a first rotating shaft, and the first rotating shaft is rotatably connected to the left end of the front base supporting rod and the left end of the rear base supporting rod,
   wherein the carrying platform comprises:
   two carrying platform supporting rods with equal length which are horizontally arranged, wherein lengths of the two carrying platform supporting rods are greater than that of the front base supporting rod, wherein the two carrying platform supporting rods are arranged in parallel in front-to-back manner, wherein the left ends of the two carrying platform supporting rods are connected through a second rotating shaft, and the second rotating shaft is rotatably connected to the left ends of the two carrying platform supporting rods, wherein the right ends of the two carrying platform supporting rods are connected through a third rotating shaft, and the third rotating shaft is rotatably connected to the right ends of the two carrying platform supporting rods, wherein the lifting mechanism comprises: a first lifting rod, a second lifting rod, a third lifting rod, a fourth lifting rod, a fifth lifting rod, a sixth lifting rod, a seventh lifting rod and an eighth lifting rod which are equal in length, wherein the first lifting rod and the second lifting rod are arranged in parallel in front-to-back manner, the third lifting rod and the fourth lifting rod are arranged in parallel in front-to-back manner, the fifth lifting rod and the sixth lifting rod are arranged in parallel in front-to-back manner, and the seventh lifting rod and the eighth lifting rod are arranged in parallel in front-to-back manner, wherein a first pin shaft is rotatably erected between the two carrying platform supporting rods, and the first pin shaft is arranged between the second rotating shaft and the third rotating shaft, wherein the upper ends of the first lifting rod, the second lifting rod, the fifth lifting rod and the sixth lifting rod are respectively rotatably arranged on the first pin shaft, wherein the lower ends of the fifth lifting rod and the sixth lifting rod are rotatably arranged on the first rotating shaft, and the upper ends of the third lifting rod and the fourth lifting rod are rotatably arranged on the second rotating shaft, wherein the lower end of the first lifting rod is connected to the lower end of the third lifting rod through a first connecting rod, and the lower end of the first lifting rod is rotatably connected to the right end of the first connecting rod, wherein the lower end of the third lifting rod is rotatably connected to the left end of the first connecting rod, and the lower end of the second lifting rod is connected to the lower end of the fourth lifting rod through a second connecting rod, wherein the lower end of the second lifting rod is rotatably connected to the right end of the second connecting rod, and the lower end of the fourth lifting rod is rotatably connected to the left end of the second connecting rod, wherein the upper ends of the seventh lifting rod and the eighth lifting rod are rotatably arranged on the third rotating shaft, wherein the lower end of the seventh lifting rod is rotatably connected to the right end of the front base supporting rod, and the lower end of the eighth lifting rod is rotatably connected to the right end of the rear base supporting rod, wherein the lower ends of the third lifting rod and the fourth lifting rod are connected through a fourth rotating shaft, wherein the lower ends of the third lifting rod and the fourth lifting rod, as well as the left ends of the first connecting rod and the second connecting rod, are rotatably connected with the fourth rotating shaft, wherein a locking mechanism for locking a highest lifting position of the carrying platform is arranged in front of the fourth rotating shaft and the first rotating shaft, wherein the power mechanism is an oil cylinder, wherein a horizontal driving connecting rod is fixedly erected between the seventh lifting rod and the eighth lifting rod, wherein a cylinder body of the oil cylinder is rotatably arranged on the driving connecting rod, and a piston rod of the oil cylinder is rotatably arranged on the fourth rotating shaft.

2. The lifting machine of claim 1, wherein the locking mechanism comprises:
a locking hook, and the locking hook further comprises:
a locking plate, wherein the left end of the locking plate is rotatably mounted on the first rotating shaft, and the right end of the locking plate is bent downwards to form a bent portion inclining to the left end of the locking plate from top to bottom, wherein a hooking groove is formed between the bent portion and the locking plate, and a locking convex block protruding upwards is arranged on the fourth rotating shaft, wherein when the lifting machine is in a locked state, the locking convex block is located in the hooking groove, and the left end surface of the bent portion is hooked on the right end surface of the locking convex block.

3. The lifting machine of claim 1, wherein the driving connecting rod is located between the upper end and the lower end of the seventh lifting rod.

4. The lifting machine of claim 1, wherein both ends of the first connecting rod and the second connecting rod are provided with rolling wheels.

5. The lifting machine of claim 4, wherein the front base supporting rod and the rear base supporting rod are connected through a horizontally arranged connecting base plate, and the rolling wheels are arranged on the connecting base plate in a rolling manner.

6. The lifting machine of claim 1, wherein the upper ends of the first lifting rod, the second lifting rod, the third lifting rod and the fourth lifting rod are located inside the two carrying platform supporting rods, wherein the lower ends of the first lifting rod, the second lifting rod, the third lifting rod and the fourth lifting rod are respectively located inside the front base supporting rod and the rear base supporting rod, wherein the upper ends of the fifth lifting rod and the sixth lifting rod are respectively located outside the two carrying platform supporting rods, and the lower ends of the fifth lifting rod and the sixth lifting rod are respectively located outside the front base supporting rod and the rear base supporting rod, wherein the upper ends of the seventh lifting rod and the eighth lifting rod are located inside the two carrying platform supporting rods, and the lower ends of the seventh lifting rod and the eighth lifting rod are respectively located inside the front base supporting rod and the rear base supporting rod.

7. The lifting machine of claim 1, wherein the two ends of the carrying platform are respectively provided with a horizontal supporting plate, and the supporting plate is fixedly mounted between the two carrying platform supporting rods, wherein a first supporting cushion block is detachably arranged on the supporting plate.

8. The lifting machine of claim 1, wherein the lifting machine further comprises:
an extension assembly, wherein the extension assembly comprises:
two base extension supporting rods with equal length,
two carrying platform extension supporting rods with equal length,
a ninth lifting rod and a tenth lifting rod which are equal in length,
wherein each of the base extension supporting rods and each of the carrying platform extension supporting rods are equal in length;
wherein the ninth lifting rod and the first lifting rod are equal in length, wherein the two base extension supporting rods are arranged in parallel in front-to-back manner, and the spacing between the two base extension supporting rods is equal to that between the front base supporting rod and the rear base supporting rod, wherein the right ends of the two base extension supporting rods are connected to a fifth rotating shaft, and the fifth rotating shaft is rotatably connected to the right ends of the two base extension supporting rods, wherein the two carrying platform extension supporting rods are arranged in parallel in front-to-back manner, and the spacing between the two carrying platform extension supporting rods is equal to that between the two carrying platform supporting rods, wherein the right ends of the two carrying platform extension supporting rods are connected to a sixth rotating shaft, and the sixth rotating shaft is rotatably connected to the right ends of the two carrying platform extension supporting rods, wherein the upper ends of the ninth lifting rod and the tenth lifting rod are rotatably arranged on the sixth rotating shaft, and the lower ends of the ninth lifting rod and the tenth lifting rod are rotatably arranged on the fifth rotating shaft, wherein the front base supporting rod and a first one of the base extension supporting rods located at the rear, the front base supporting rod and a second one of the base extension supporting rods located at the front, a first one of the carrying platform supporting rods located at the front and a first one of the carrying platform extension supporting rods located at the front, as well as a second one of the carrying platform supporting rods located at the rear and a second one of the carrying platform extension supporting rods located at the rear are respectively rotatably connected through a corresponding connecting plate of four connecting plates, wherein after being pushed up, the seventh lifting rod, the eighth lifting rod, the ninth lifting rod, the tenth lifting rod, the two base extension supporting rods, the two carrying platform extension supporting rods and the four connecting plates form a parallelogram-shaped supporting frame.

9. The lifting machine of claim 8, wherein each connecting plate of the four connecting plates is provided with a plurality of mounting through holes from left to right at intervals, wherein the same positions of the front base supporting rod and the rear base supporting rod, as well as the left ends of the two base extension supporting rods are all provided with base mounting through holes, wherein a detachable connection between the connecting plate and the front base supporting rod, and a detachable connection between the rear base supporting rod and the two base extension supporting rods are achieved through base connecting shafts arranged between the base mounting through holes and the corresponding mounting through holes, wherein the left end of each of the base extension supporting rods and a corresponding base connecting shaft of the base connecting shafts are rotatably connected, wherein the same positions of the two carrying platform supporting rods and the left ends of the two carrying platform extension supporting rods are provided with carrying platform mounting through holes, wherein a detachable connection between the connecting plate and the two carrying platform supporting rods, and a detachable connection between the connecting plate and the two carrying platform extension supporting rods are achieved through carrying platform connecting shafts arranged between the carrying platform mounting through holes and the corresponding mounting through holes, wherein the left end of each of the carrying platform extension supporting rods and a corresponding carrying platform connecting shaft of the carrying platform connecting shafts are rotatably connected, wherein a connecting line between the center of the carrying platform mounting through hole in the first one of the carrying platform supporting rods located at the front and the center of the base mounting through hole in the front base supporting rod is parallel to the central axis of the seventh lifting rod, wherein a connecting line between the center of the carrying platform mounting through hole in the second one of the carrying platform supporting rods located at the rear and the center of the base mounting through hole in the rear base supporting rod is parallel to the central axis of the eighth lifting rod.

10. The lifting machine of claim 7, wherein an extension connecting plate is arranged between the two carrying platform extension supporting rods, and a second supporting cushion block is detachably arranged on the extension connecting plate.

\* \* \* \* \*